Oct. 31, 1961

G. ST. Q. SCOTT 3,006,103

FISHERMEN'S SINKERS CAPABLE OF BEING
USED AS LURES OR SPINNERS

Filed April 20, 1959

GRAHAM
ST. QUINTIN SCOTT
INVENTOR

BY Wenderoth, Lind
& Ponack
ATTORNEYS

United States Patent Office 3,006,103
Patented Oct. 31, 1961

3,006,103
FISHERMEN'S SINKERS CAPABLE OF BEING USED AS LURES OR SPINNERS
Graham St. Q. Scott, 23 Ebden St., Queenstown, Cape Province, Union of South Africa
Filed Apr. 20, 1959, Ser. No. 807,584
Claims priority, application Union of South Africa Apr. 22, 1958
13 Claims. (Cl. 43—42.06)

This invention relates to sinkers as used by fishermen for the purpose of assisting casting and for anchoring the fishing line on the sea bottom after a cast has been made.

Sinkers for this purpose are usually made of lead and are cast to various sizes and shapes.

When fishing off rocks the ordinary sinker tends to become caught or wedged between or under rocks on the sea bottom and many sinkers, hooks and lengths of line are lost annually due to this tendency.

An object of this invention is to provide an improved construction of sinker which, to a very large extent, will overcome this tendency to be caught or "hooked up" on the sea bottom.

According to the invention, a sinker for the purpose set forth consists of a piece of heavy material such as lead of elongated flat form, having one end, constituting the front end, shod with a buffer element of resilient material, such as rubber which sinker is adapted to be attached to the end of a fishing line by attachment means, such as a ring or eye fixed to the sinker on its top side intermediately of its ends but nearer the said front end than the other or rear end such that when the sinker is drawn through the water it has a hydroplaning characteristic with the rear end acting as a controlling tail fin to keep the front end pointing in the direction of travel of the sinker through the water. The resilient buffer element is fixed to the front end of the sinker body so that it is set at an oblique angle to the axis or center line thereof and its front edge is arranged to project beyond the plane of the top side of said sinker body.

According to a preferred construction, the sinker body, cast from lead, is of substantially heart shape with the pointed or apex end extended in the form of a tail fin which constitutes the rear end.

The front scalloped end of the sinker body is provided with an oblique face on what is the underside thereof, to which face the said buffer element is secured. Preferably the buffer element is in the form of a flat strip of rubber or the equivalent. The front edge of the buffer element projects beyond the front end of the sinker body and is scalloped to conform to such front end. The buffer element is secured to said oblique face by means of rivets, bolts, or like fastening devices arranged to pass through spaced fixing holes in both parts, or by an adhesive. A metal eye is fixed to or cast into the sinker body at a point positioned towards the front end thereof and just rearwardly of the center inwardly directed scallop thereof so that said eye is on the top side of the sinker body opposite to the side on which the buffer element is attached. A loose ring is preferably connected to this fixed eye, and the end of the line is attached to such ring. When a line is attached to this loose ring and a cast is made, and a sharp tug on the line has the effect of drawing the sinker against an obstruction on the sea bottom, the rubber-shod front end causes the sinker to bounce off and away from such obstruction. Since the buffer element slopes at an angle to the general plane of the sinker body, reeling in of the line induces, a hydroplaning effect on the sinker, which is thus propelled through the water at speed, causing it continually to bounce off any obstructions it may strike against on its way to the surface.

The shape and form of the sinker enables it to act as effective anchoring means when it lands on the sea bottom after a cast, while the above described action of the buffer element enables it to be retrieved even from the rockiest of sea bottoms.

The sinker will, of course, be made in different sizes to conform to the different weights required by anglers.

According to a modification of the invention, the improved sinker, with one or more additions, may be made to constitute a lure or spinner for the catching of certain types of surface feeding fish, whereby it will fulfil a dual purpose.

Accordingly a sinker as previously described, is adapted to be used as a lure or spinner by arranging for one or more fish hooks to be attached or made attachable to it. Preferably when so used, the buffer element is omitted or removed and the spaced fixing holes which extend through the front portion of the device from the oblique face to the top side thereof, besides giving the appearance of eyes, create two spouts or jets of water as the spinner is drawn along the surface of the water during spinning or trolling operations which effect thereby increases the attractiveness of the lure to certain types of fish.

The hook or hooks is or are preferably embedded in it during the casting operation so that the shank portion or portions of the hook or hooks is or are in fact embedded in the material while the barbed hooked portion or portions projects or project rearwardly from the tail end of the lure. The body part is preferably cast from a bright metal such as lead, aluminium, white metal or the like, so that its surface can be polished thereby rendering the lure more attractive to the fish to be caught. Alternatively it may be moulded from a suitable plastic and made in various colours to represent a living creature. In a modified construction, the eye for attachment of the line positioned towards the front end of the body part and projecting from the top side thereof, may be bent from a length of wire, one end portion of which may be arranged to extend rearwardly and is embedded in the body part so that its extreme end projects from the rear tail fin thereof where it is bent into a hook or eye to which the usual barbed fish hook or hooks may be permanently or removaly attached. In a further alternative arrangement, the rear end or tail fin of the body part may be provided with a recess, and the said rear hook or eye bent from a portion of the wire or the like forming the attachment eye, may be located within this recess so that when the fish hook or hooks is or are attached thereto, their side-ways movement will be restricted.

If considered necessary or desirable auxiliary fish hooks may be attached to the sides, bottom and/or top of the body part of the sinker.

To enable the invention to be more clearly understood and carried into practice, reference is now made to the accompanying drawings in which like references denote like parts throughout the several views.

Figure 1:
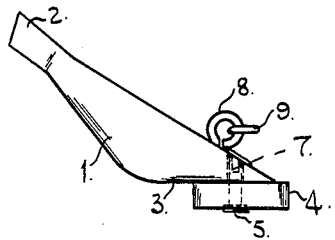
FIGURE 1 is a side elevation of sinker constructed according to the invention.
Figure 2:
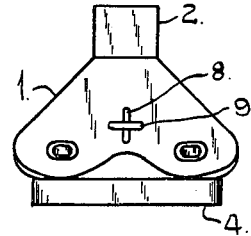
FIGURE 2 is a front elevation of the sinker of FIG. 1.
Figure 3:
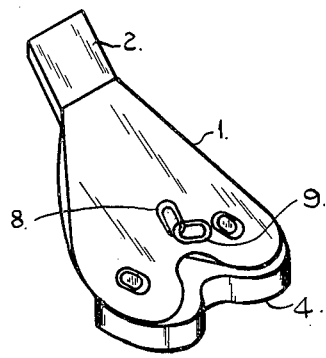
FIGURE 3 is a pictorial view of the sinker of FIGS. 1 and 2 taken from above and looking at it in an oblique direction.

Referring to FIGS. 1 to 3 of the drawings, reference 1 denotes the body portion of the sinker preferably cast from lead and having a flattened substantially heart shape with the rear apex end extended to provide a tail fin 2. The underside of the body part 1, is provided with an oblique face 3 to which the rubber buffer element 4 consisting of a strip of rubber, is attached by two tubular ended rivets 5 passing through two spaced holes 6 in the buffer element and corresponding holes 7 in the front end of the body part 1. As shown in FIGS. 1 and 3, the front edge of the buffer element 4 projects forwardly beyond the front scalloped end of the body part 1, and such edge is scalloped to conform to the shape of such front end. An eye 8 projects from the top side of the body part 1 and a ring 9 is connected to it. The end of a fishing line is adapted to be attached to the ring 9. Instead of the rivets 5, small bolts and nuts (not shown) may be used for fixing the buffer element 4 to the oblique face 3 of the sinker body part 1.

FIGURES 4 to 7 illustrate modifications of the invention which enable it to be used as a lure or spinner. In all these modifications the buffer element 4 is redundant and is therefore omitted or removed.

Figure 4:
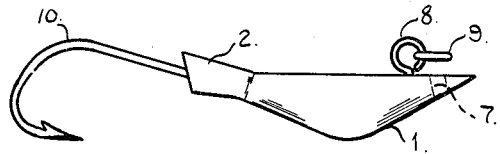
FIGURE 4 is a side elevation of the sinker of FIGS. 1 to 3 which is modified for use as a lure or spinner by having a fish hook fixed to the tail fin thereof.

In FIGURE 4, a fish hook 10 is permanently attached to the tail fin 2 by arranging for portion of its shank to be embedded therein during the casting operation.

Figure 5:
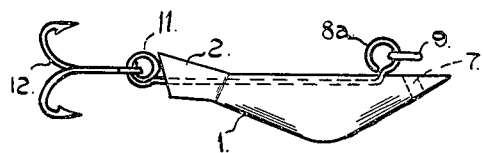
FIGURE 5 is a side elevation similar to that of FIG. 4, modified by having a double fish hook detachably secured at the tail fin end of the sinker body.

In FIGURE 5, the line attachment eye 8a is bent from a length of wire, one end portion of which is arranged as shown, to extend rearwardly and is embedded in the body part 1, so that its extreme end projects from the end of the rear tail fin 2, where it is bent into a hook or eye 11 to which the double fish hook 12 can be removably attached.

Figure 6:
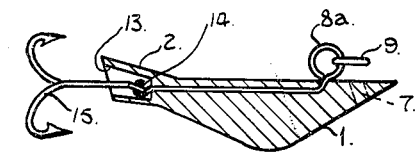
FIGURE 6 is a vertical sectional view of the sinker of FIG. 5, showing a further modified construction.

FIGURE 6 shows a modification of the construction shown by FIG. 5, in which the tail fin 2 is provided with a recess 13 and a hook 14 on the extreme end of the wire forming the line attachment eye 8a, is located within this recess, so that when a fish hook 15 is attached to the hook 14, its sideways movement is restricted, and unwanted out of line displacement of the hook 15 is thereby prevented.

Figure 7:
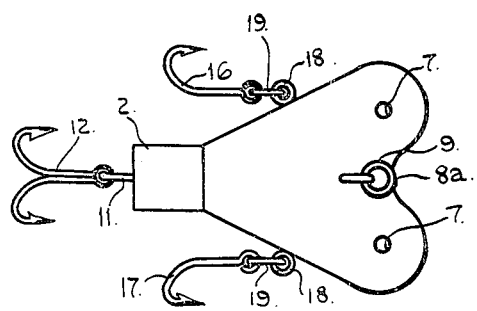
FIGURE 7 is a plan view taken substantially on FIG. 5 and showing the provision of auxiliary fish hooks on the sides thereof.

FIGURE 7 shows yet a further modification of the device of FIG. 5 in which auxiliary fish hooks 16 and 17 are attachable to the sides of the body part 1 by means of eyes 18 and split rings 19.

I claim:

1. A fishing line sinker which consists of a single piece of heavy material forming the sinker body and being substantially heart shaped in plan view with the broad end thereof being the front end and the narrow tapering end being the rear end, said sinker body having a flat top side, a buffer element of resilient material on the front end of the sinker body projecting beyond the front end of said body, and attachment means for attaching the sinker to a fishing line, said attachment means being on the flat top side of the sinker body between the ends thereof and being closer to the front end than to the rear end, the center of gravity of said sinker being between said attachment means and the rear end of said sinker.

2. A fishing line sinker which consists of a single piece of heavy material forming the sinker body and being substantially heart shaped in plan view with the broad end thereof being the front end and the narrow tapering end being the rear end, said sinker body having a flat heart shaped top side and a front side tapering downwardly and rearwardly from the front end of said top side, a buffer element of resilient material on the front side of said sinker body and projecting downwardly and forwardly from said body beyond the front end of said top side, and attachment means for attaching the sinker to a fishing line, said attachment means being on the flat top side of the sinker body between the ends thereof and being closer to the front end than to the rear end, the center of gravity of said sinker being between said attachment means and the rear end of said sinker.

3. A sinker as claimed in claim 2, wherein the eye for attachment of the end of the fishing line projecting from the top side of the body part of the sinker is bent from a length of wire, one end portion of said wire extending rearwardly and being embedded in said sinker body with its extreme end projecting from the tail fin and being bent into a further attachment means to which the usual fish hook is capable of being permanently or removably attached.

4. A sinker as claimed in claim 3, wherein the rear end of the tail fin is provided with a recess, and the said further attachment means for the attachment of a fish hook is located within this recess so that its side-ways movement is restricted.

5. A sinker as claimed in claim 2, wherein the buffer element is in the form of a flat strip of rubber.

6. A sinker as claimed in claim 5, wherein the front edge of the buffer element which projects beyond the front end of the sinker body is scalloped to conform to such front end.

7. A sinker as claimed in claim 6 in which said buffer element is secured to said oblique face on the sinker body by adhesive.

8. A sinker as claimed in claim 6, wherein the buffer element is secured to the said oblique face provided on the sinker body by means of fastening devices extending through said buffer element and said sinker body, said buffer element and sinker body having spaced holes therein receiving said fastening devices.

9. A sinker as claimed in claim 8, wherein said attachment means comprise a metal eye fixed to the sinker body at a point positioned towards the front end thereof and just rearwardly of the center inwardly directed scallop thereof so that said eye is on the top side of the sinker body opposite to the side on which the buffer element is attached.

10. A sinker as claimed in claim 7 in which said sinker body has at least one fishhook attached thereto, whereby it can be used as a lure.

11. A sinker as claimed in claim 10 in which there are a plurality of fishhooks attached to the rear edge of said sinker body.

12. A sinker as claimed in claim 11 in which said sinker body has eyes along the rear edge thereof to which said fishhooks are attached.

13. A fishing line sinker which consists of a single piece of heavy material forming the sinker body and being substantially heart shaped in plan view with the broad end thereof being the front end and the narrow tapering end being the rear end, said sinker body having a flat heart shaped top side and a front side tapering downwardly and rearwardly from the front end of said top side, said sinker body having two holes therethrough in the scalloped end of the heart shaped outline, one on each side of the center line of the body, and attachment means for attaching the sinker to a fishing line, said attachment means being on the flat top side of the sinker body between the ends thereof and being closer to the front end than to the rear end, the center of gravity of said sinker being between said attachment means and the rear end of said sinker.

References Cited in the file of this patent

UNITED STATES PATENTS

| | | |
|---|---|---|
| 2,461,833 | Mercier | Feb. 15, 1949 |
| 2,598,771 | Eder | June 3, 1952 |
| 2,727,332 | Benson | Dec. 20, 1955 |
| 2,798,332 | Garrison | July 9, 1957 |
| 2,817,922 | Takeshita | Dec. 31, 1957 |

FOREIGN PATENTS

| | | |
|---|---|---|
| 6,736 | Great Britain | Mar. 30, 1905 |